(12) United States Patent
Trunz et al.

(10) Patent No.: US 7,227,707 B2
(45) Date of Patent: Jun. 5, 2007

(54) HOLDING DEVICE FOR AN OPTICAL ELEMENT

(75) Inventors: Michael Trunz, Ellwangen-Pfuhlheim (DE); Alexander Hinz, Koenigsbronn (DE)

(73) Assignee: Intergraph Hardware Technologies, Co. NV (US)

( * ) Notice: Subject to any disclaimer, the term of this patent is extended or adjusted under 35 U.S.C. 154(b) by 0 days.

(21) Appl. No.: 11/379,697

(22) Filed: Apr. 21, 2006

(65) Prior Publication Data
US 2006/0187561 A1  Aug. 24, 2006

Related U.S. Application Data

(63) Continuation of application No. 11/206,970, filed on Aug. 18, 2005, now abandoned, which is a continuation of application No. 10/645,243, filed on Aug. 21, 2003, now abandoned.

(30) Foreign Application Priority Data
Aug. 23, 2002 (DE) .................. 102 39 522

(51) Int. Cl.
G02B 7/02 (2006.01)
(52) U.S. Cl. ............. 359/819; 359/198; 359/820
(58) Field of Classification Search ............ 359/819
See application file for complete search history.

(56) References Cited

U.S. PATENT DOCUMENTS

| 2,736,993 | A | 3/1956 | Tripp |
| 4,777,639 | A | 10/1988 | Whitehouse |
| 5,132,776 | A | 7/1992 | Hanada et al. |
| 6,030,577 | A | 2/2000 | Commandeur et al. |
| 6,086,819 | A | 7/2000 | Commandeur et al. |
| 6,130,902 | A | 10/2000 | Shimoji |
| 6,369,959 | B1 | 4/2002 | Trunz et al. |
| 6,485,681 | B1 | 11/2002 | Commandeur et al. |
| 6,616,480 | B2 | 9/2003 | Kameyama |
| 6,658,207 | B1 | 12/2003 | Partynski et al. |
| 6,724,797 | B2 | 4/2004 | Daiber |
| 6,867,848 | B2 | 3/2005 | Ebinuma et al. |
| 2004/0066566 | A1* | 4/2004 | Trunz et al. ............. 359/819 |

FOREIGN PATENT DOCUMENTS

| DE | 3934180 A1 | 4/1990 |
| DE | 29608877 U1 | 8/1996 |
| DE | 19532244 C2 | 3/1997 |
| DE | 19532252 A1 | 3/1997 |
| DE | 19532253 C2 | 3/1997 |
| DE | 19930643 C2 | 1/2001 |
| DE | 10137848 A1 | 3/2002 |
| EP | 0 298 058 B1 | 9/1993 |
| JP | 06328355 A | 11/1994 |
| JP | 07164298 A | 6/1995 |
| JP | 11269592 A | 10/1999 |
| WO | 00/00324 A1 | 1/2000 |
| WO | 01/54861 A1 | 8/2001 |

OTHER PUBLICATIONS

Online Material Property Data Sheet; MatWeb.com, The Online Materials Database, XP-002262764, Aluminum 6061-T6; 6061-T651; Published Nov. 25, 2003, p. 1-2.

* cited by examiner

*Primary Examiner*—Jordan Schwartz
*Assistant Examiner*—Jessica Stultz
(74) *Attorney, Agent, or Firm*—GrayRobinson, P.A.

(57) ABSTRACT

A holding device for an optical element, is formed at least in part, of a silicon-containing aluminum material.

5 Claims, 1 Drawing Sheet

HOLDING DEVICE FOR AN OPTICAL ELEMENT

PRIORITY CLAIM

Priority is hereby claimed under 35 U.S.C. §119 to German patent application serial number 102 39 522.5 filed on Aug. 23, 2002.

FIELD OF THE INVENTION

The invention relates to the field of optics. More particularly, the invention relates to a holding device for an optical element.

BACKGROUND

Optical elements such as lenses, plain plates, mirrors, prism and others are used in optical imaging devices, for example camera objectives, telescopes or binoculars. Optical elements of this type generally consist of glass and are held on a support device by means of metal or plastic components. To achieve a high imaging quality with optical imaging devices, it is necessary for these holding devices to have a high mechanical stability. If optical imaging devices are exposed to changing environmental influences, such as for example temperature fluctuations, there is a risk of the optical elements of the imaging device in the imaging beam path moving. In the case of imaging devices, this causes color errors and geometric image errors. Errors of this type can also be produced by vibrations and bumps.

To increase the thermal stability of camera objectives, it is known, for example, from EP 0 298 058 B1 to provide an annular, slotted holding element made from aluminum for a lens. Radial recesses are situated at regular intervals at this holding element and have the effect of ensuring that the lens does not shift out of the optical axis of the objective in the event of temperature fluctuations despite the holding element and lens having a different expansion.

Particularly high stability requirements are imposed on objectives for aerial picture cameras. Aerial picture cameras of this type are required to provide a geometrically accurate image of an image area by means of an aerial picture. The picture resolution and the geometric picture stability has to be at least 2 μm over the entire image area. To satisfy these requirements over a wide temperature range from approx. −40° C. to approx. +70° C. and under vibrational and impact loads in flight, objectives of this type are made from metal materials, the expansion coefficient of which is matched to that of the optical glasses used in the objective. For aerial picture camera objectives, such as for example the objective DMC 4/120 mm produced by Carl Zeiss, therefore, the material X14 with a coefficient of thermal expansion α in the range from $10*10^{-6}K^{-1}$ to $11*10^{-6}K^{-1}$ is used for lens mounts, or alternatively titanium is used, the coefficient of thermal expansion of which is $\alpha=9*10^{-6}K^{-1}$. The outer housing of an objective of this type is usually made from special steel, for example X14 or X12. This allows the mechanical stresses which the outer housing exerts on the lens mounts to be minimized. However, the materials mentioned are approximately three times as heavy as aluminum. Aluminum is used as material for mounts and housings of conventional photographic objectives. On account of its high coefficient of thermal expansion of $\alpha=24*10^{-6}K^{-1}$, however, it is not suitable for use in objectives for aerial picture cameras. This would lead to excessive distortion and inadequate imaging performance.

SUMMARY OF THE INVENTION

The invention provides a holding device for an optical element which has a low inherent weight and is suitable for use in highly stable objectives which can be used in particular in aerial picture cameras.

A preferred embodiment of a holding device for an optical element in accordance with the invention includes at least one member of a silicon-containing aluminum material. In a particularly preferred embodiment, a material which, at a temperature in the region of 21° C., has a coefficient of thermal expansion of $\alpha \leq 24*10^{-6}K^{-1}$ at a density of $\rho \leq 7.5$ g/cm³ is provided for at least partially supporting or otherwise holding an optical element such as a lens, plain plate, mirror or other optical element of an optical system or optical apparatus such as, for example, a camera, binocular, telescope, telescopic sight or other optical device. A process for producing a material of this type is described in DE 195 32 244 C2, DE 195 32 253 C2 and DE 195 32 252 A1 which are all expressly incorporated herein by reference in their entireties to form part of the present disclosure. These documents ex plain that this material is a wear-resistant, thermally stable material which is suitable for cylinder liners in engines.

The holding device consists, at least in part, of a silicon-containing aluminum material, in which the silicon content is selected in such a way that the thermal expansion coefficient of the silicon-containing aluminum material is substantially matched to the thermal expansion coefficient of an optical element in the holding device. In this way, it is possible to keep mechanical stresses between an optical element in the holding device and the holding device itself constant over a wide temperature range.

The optical element may comprise, for example, and not by way of limitation, a lens, a plain plate, a mirror and/or a prism. In this way, it is possible to create an optical instrument, the stability or performance of which is not impaired in the event of changing environmental influences.

The holding device of the invention may suitably, for example, and not by way of limitation, be formed to make up all or part of a lens mount. The holding device may alternatively be configured to make up all or part of an objective housing. In this way, it is possible to provide an accurate, thermally stable high-performance objective.

Preferably, the silicon content in the aluminum material is more than 15% by weight. This ensures that the aluminum material has good machining properties.

Even more preferably, the silicon content in the aluminum material is more than 30 or, most preferably, more than 40% by weight. This creates a particularly lightweight holding device.

Optical element holding devices according to the invention are suited to a variety of applications. They are particularly suitable for use in aerial photography cameras, especially those deployed in light aircraft and unmanned projectiles where maintaining light weight while still providing precision performance is of particular concern.

DETAILED DESCRIPTION

Figure 1:
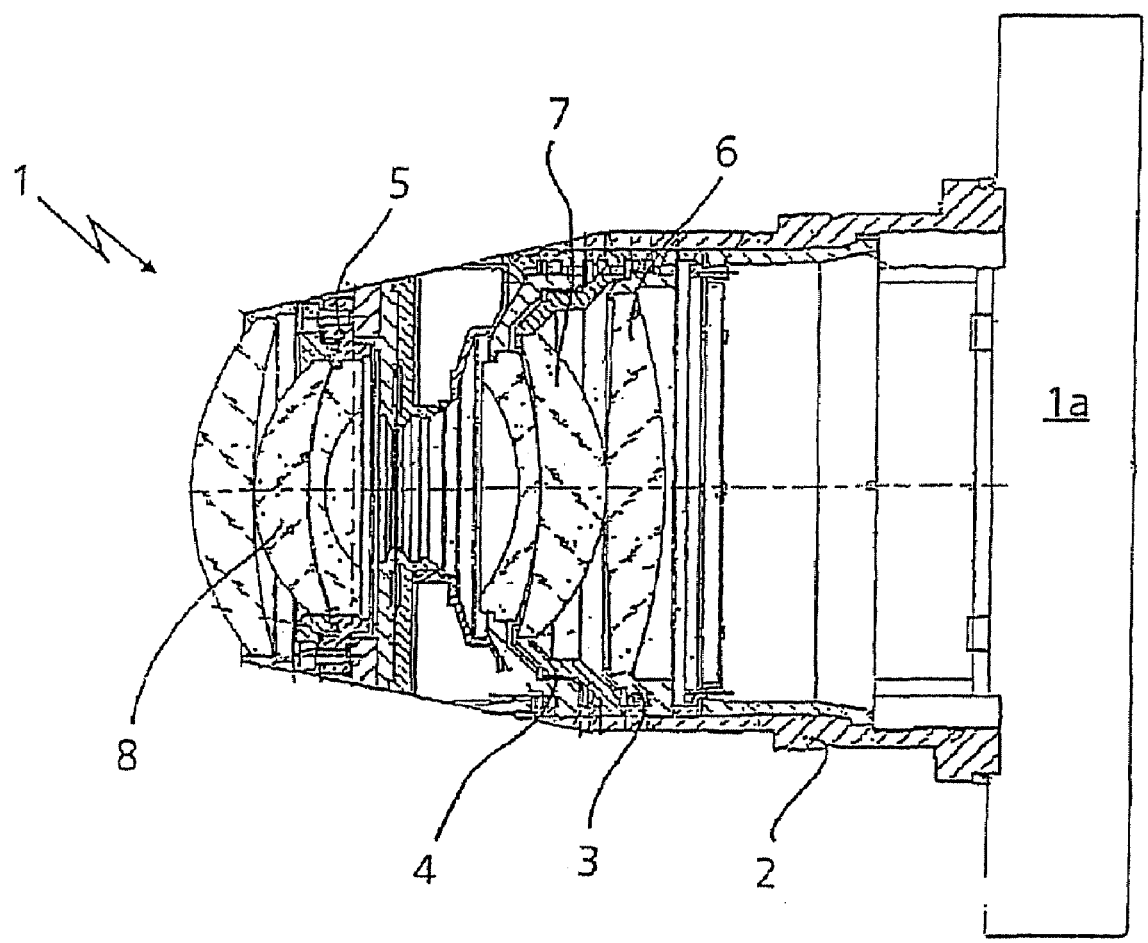
FIG. 1 is a side cross sectional view of an objective for an aerial picture camera illustrating a preferred embodiment of the invention.

As illustrated in FIG. 1 and is described below, FIG. 1 shows an objective 1 for an aerial picture camera 1a constructed according to the present invention. The objective 1 comprises an objective housing 2 in which objective lenses 6, 7 and 8 are held by means of mounts 3, 4 and 5.

In accordance with the invention, at least one and preferably each of, the objective housing 2 and the mounts 3, 4 and 5 is a member which is formed at least in part, but preferably wholly, of an aluminum alloy which, according to a preferred form of the invention, has the following composition:
Silicon: 33-35% by weight,
Iron: 1.8-2.2% by weight,
Nickel: 0.8-1.2% by weight,
Aluminum: Remainder.

An aluminum alloy of this type is marketed by PEAK Werkstoff GmbH, Siebeneicker Strasse 235, 42553 Velbert, Germany, under the trade name "Dispal®" and has the following physical properties:

| Property | In the range | Unit | Value |
|---|---|---|---|
| Density | 21° C. | g/cm³ | 2.62 |
| Coefficient of thermal expansion | 21–100° C. | $10^{-6}$/K | 12 |
| | 21–200° C. | $10^{-6}$/K | 13 |
| | 21–300° C. | $10^{-6}$/K | 14 |
| | 21–400° C. | $10^{-6}$/K | 14 |

By changing the silicon content in the alloy, it is possible to set the expansion coefficient of the material for the holding device and in this way to match it to the expansion coefficient of the glass of an optical element which is used, for example of a lens. PEAK offers the material with a silicon content between 17% by weight and 35% by weight. In addition to a good wear resistance and a high rigidity, this material has good machining properties and has a high strength even at high temperatures of use.

It should be noted that it is also possible for only the objective housing (2) or portion(s) of it to be made from an aluminum alloy as described, while using a different material for some or all the lens mounts or vice versa.

While the preferred embodiment of FIG. 1 shows holding devices for a lens, those skilled in the art will appreciate in light of the present disclosure that a holding device according to the present invention can be constructed in any desired shape as appropriate to at least partially support or otherwise hold other optical elements or combinations of optical elements of various kinds including without limitation lenses, plain plates, mirrors, prisms and/or others.

What is claimed is:

1. An objective for an aerial picture camera, comprising:
an objective housing;
an objective lens having a coefficient of thermal expansion;
a mount supported by said objective housing, said mount holding said objective lens, said mount being positioned in direct thermal communication with both said objective lens and said objective housing;
said objective housing and said mount being formed substantially entirely of a silicon-containing aluminum material having a coefficient of thermal expansion which matches said coefficient of thermal expansion of said objective lens.

2. An objective as claimed in claim 1, wherein, the silicon content of said aluminum material is more than 15% by weight.

3. An objective as claimed in claim 1, wherein the silicon content of said aluminum material is more than 30% by weight.

4. An objective as claimed in claim 1, wherein the silicon content of said aluminum material is more than 40% by weight.

5. An objective for an aerial picture camera, comprising:
an objective housing;
an objective lens having a coefficient of thermal expansion;
a mount supported by said objective housing, said mount holding said objective lens, said mount being positioned in direct thermal communication with both said objective lens and said objective housing;
said objective housing and said mount being formed substantially entirely of a silicon-containing aluminum material having a coefficient of thermal expansion which matches said coefficient of thermal expansion of said objective lens, and said material is a material which, at a temperature in the region of 21° C., has a coefficient of thermal expansion $\alpha \leq 24*10^{-6} K^{-1}$ at a density of $\rho \leq 7.5$ g/cm³.

* * * * *

UNITED STATES PATENT AND TRADEMARK OFFICE
CERTIFICATE OF CORRECTION

PATENT NO. : 7,227,707 B2 Page 1 of 1
APPLICATION NO. : 11/379697
DATED : June 5, 2007
INVENTOR(S) : Trunz et al.

It is certified that error appears in the above-identified patent and that said Letters Patent is hereby corrected as shown below:

Column 1, line 19:
 delete the word "prism" and replace with --prisms--

Column 2, line 23:
 delete the word "ex plain" and replace with --explain--

Signed and Sealed this

Thirteenth Day of November, 2007

JON W. DUDAS
*Director of the United States Patent and Trademark Office*